US008073426B2

(12) United States Patent
Ishikawa

(10) Patent No.: US 8,073,426 B2
(45) Date of Patent: Dec. 6, 2011

(54) AUTHENTICATION VECTOR GENERATION DEVICE, SUBSCRIBER IDENTITY MODULE, WIRELESS COMMUNICATION SYSTEM, AUTHENTICATION VECTOR GENERATION METHOD, CALCULATION METHOD, AND SUBSCRIBER AUTHENTICATION METHOD

(75) Inventor: Hidetoshi Ishikawa, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 637 days.

(21) Appl. No.: 11/332,534

(22) Filed: Jan. 17, 2006

(65) Prior Publication Data

US 2006/0172723 A1     Aug. 3, 2006

(30) Foreign Application Priority Data

Feb. 1, 2005    (JP) .................................. 2005-025440

(51) Int. Cl.
*H04M 1/66*    (2006.01)

(52) U.S. Cl. ........ 455/410; 455/411; 370/338; 370/352; 370/389; 713/172; 713/182

(58) Field of Classification Search .......... 455/410–411, 455/432.1, 433, 435.1, 552.1; 370/252, 278, 370/338, 352, 353, 356, 386, 389, 401; 713/151, 713/155, 168, 169, 171, 182; 380/33, 247, 380/258–259, 270–280
See application file for complete search history.

(56) References Cited

U.S. PATENT DOCUMENTS

| 6,671,507 | B1 | 12/2003 | Vinck | |
| 6,690,930 | B1* | 2/2004 | Dupre | ........................... 455/411 |
| 2003/0119481 | A1* | 6/2003 | Haverinen et al. | ............ 455/411 |
| 2004/0229597 | A1 | 11/2004 | Patel | |

(Continued)

FOREIGN PATENT DOCUMENTS

| EP | 0 915 630 A2 | 5/1999 |
| EP | 1 005 244 A1 | 5/2000 |
| EP | 1 172 776 A2 | 1/2002 |
| EP | 1 613 116 A1 | 1/2006 |

(Continued)

OTHER PUBLICATIONS

"$3^{rd}$ Generation Partnership Project; Technical Specification Group Services and System Aspects; 3G Security; Security Architecture (Release 1999)", 3GPP TS 33.102 V3.13.0 (Dec. 2002), pp. 1-63.

(Continued)

*Primary Examiner* — Dwayne Bost
*Assistant Examiner* — Inder Mehra
(74) *Attorney, Agent, or Firm* — Oblon, Spivak, McClelland, Maier & Neustadt, L.L.P.

(57) ABSTRACT

According to the present invention, a subscriber identity module in a wireless local area network is authenticated using an authentication vector with no decrease in the confidentiality of the calculation processing, even when a triplet is employed as the authentication vector. An HLR of a mobile communication network comprises an attachment unit for attaching to a RAND field of an authentication vector, which is used to authenticate an SIM in a wireless local area network, information specifying calculation information that is constituted by at least one of an algorithm and secret information for use in the authentication calculation. The SIM, which is mounted on a wireless LAN terminal, comprises a calculation information storage unit storing in advance a plurality of the calculation information, a specification unit for specifying the calculation information to be used in the calculation from the plurality of calculation information stored in the calculation information storage unit by referring to information specifying the calculation information, and a calculation unit for performing the calculation on the basis of the specified calculation information.

20 Claims, 4 Drawing Sheets

U.S. PATENT DOCUMENTS

| | | | |
|---|---|---|---|
| 2004/0236964 A1 | 11/2004 | Haverinen | |
| 2005/0251681 A1* | 11/2005 | Robles et al. | 713/172 |
| 2006/0003738 A1* | 1/2006 | Ishikawa | 455/411 |
| 2006/0075262 A1* | 4/2006 | Kim et al. | 713/193 |
| 2006/0095959 A1* | 5/2006 | Williams et al. | 726/8 |
| 2008/0200147 A1* | 8/2008 | Nylander et al. | 455/411 |

FOREIGN PATENT DOCUMENTS

| | | |
|---|---|---|
| JP | 07-226732 | 8/1995 |
| TW | 200300320 | 5/2003 |
| TW | 200303147 | 8/2003 |
| WO | WO 99/62275 | 12/1999 |

OTHER PUBLICATIONS

"3rd Generation Partnership Project; Technical Specification Group Services and System Aspects; 3GPP System to Wireless Local Area Network (WLAN) Interworking; System Description (Release 6)", 3GPP TS 23.234 V6.0.0 (Mar. 2004), pp. 1-83.

"Universal Mobile Telecommunications System (UMTS); 3GPP System to Wireless Local Area Network (WLAN) interworking; System description (3GPP TS 23.234 version 6.3.0 Release 6); ETSI TS 123 234", Sophia Antipo, ETSI Standards, European Telecommunications Standars Institute, XP-014027533, Dec. 2004, pp. 1-98.

3rd Generation Partnership Project; Technical Specification Group Services and System Aspects; 3GPP System to Wireless Local Area Network (WLAN); 3GPP TS 23.234, V6.3.0, Dec. 31, 2004, p. 40-41, 69-72.

Office Action issued in co-pending U.S. Appl. No. 12/561,305.

Office Action issued in Japanese Patent Application No. 2005-025440 on Nov. 24, 2010.

Office Action mailed May 13, 2010, in co-pending U.S. Appl. No. 12/561,305.

\* cited by examiner

Fig.4
(a)
(b)
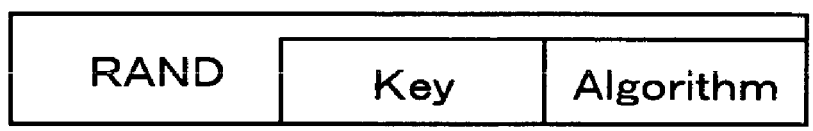

AUTHENTICATION VECTOR GENERATION DEVICE, SUBSCRIBER IDENTITY MODULE, WIRELESS COMMUNICATION SYSTEM, AUTHENTICATION VECTOR GENERATION METHOD, CALCULATION METHOD, AND SUBSCRIBER AUTHENTICATION METHOD

BACKGROUND OF THE INVENTION

1. Field of the Invention

The present invention relates to an authentication vector generation device, a subscriber identity module, a wireless communication system, an authentication vector generation method, a calculation method, and a subscriber authentication method.

2. Related Background of the Invention

In IMT-2000 (International Mobile Telecommunication 2000), which is a third generation mobile communication system, and GSM (Global System for Mobile Communications), which is a second generation mobile communication system that is compatible with IMT-2000, authentication has been standardized in the following manner. A subscriber identity module (USIM: Universal Subscriber Identity Module, or SIM: Subscriber Identity Module), issued by a network operator, a service provider or the like to which a subscriber of a mobile communication network is contracted, is mounted on subscriber side terminal equipment (ME: Mobile Equipment, for example a mobile telephone, cellular phone or other wireless terminal), thereby realizing mutual authentication between the mobile communication network (to be referred to as the "home network" hereafter) that is serviced by the network operator, a service provider or the like to which the subscriber is contracted, and the subscriber identity module of the home network, during outgoing-call, incoming-call, and so on.

In IMT-2000 and GSM, the mobile communication network comprises the following network nodes for performing authentication: an authentication vector generation device (HLR: Home Location Register) for generating an authentication vector (AV) used to authenticate the subscriber identity module, and an authentication device (VLR: Visitor Location Register) for performing authentication processing with the subscriber identity module. In IMT-2000 and GSM, subscriber identity module authentication processing is performed in the following manner. First, an authentication device transmits to the subscriber identity module predetermined data included in an authentication vector generated by the authentication vector generation device. A calculation is then performed in the subscriber identity module using the predetermined data. The calculation result is transmitted to the authentication device, and verified in the authentication device using the predetermined data included in the authentication vector. This is described in "3GPP TS 33. 102 V3. 13. 0 (2002-12): "3rd Generation Partnership Project (3GPP); Technical Specification Group Services and System Aspects; 3G Security; Security Architecture (Release 1999)"" (Non-patent Document 1), for example.

In IMT-2000 and GSM, authentication using the authentication vector described above has been standardized for use in a wireless local area network (LAN) connected to the mobile communication network produced by IMT-2000 and GSM. This is described in "3GPP TS 23. 234 V6. 0. 0 (2004-03): "3rd Generation Partnership Project; Technical Specification Group Services and System Aspects; 3GPP System to Wireless Local Area Network (WLAN) interworking; System description (Release 6)"" (Non-patent Document 2), for example.

SUMMARY OF THE INVENTION

In the specification described the above Non-patent Document 1, there are two types of authentication vector, namely a quintet and a triplet. The quintet comprises five fields: RAND, XRES, CK, IK, and AUTN. The above specification cites an example in which the AUTN field includes information specifying an algorithm, selected from a plurality of algorithms stored in the subscriber identity module, for use in the authentication calculation. In the subscriber identity module, the algorithm to be used in the authentication calculation is specified from among the plurality of algorithms on the basis of this information, whereupon the calculation is performed. As a result, the confidentiality of the calculation processing is increased, enabling highly secure authentication. Further, using a similar method to that described above, in which information specifying an algorithm is included in the AUTN field, secret information for use in the calculation may also be specified from among a plurality of information in the subscriber identity module with the aim of improving the confidentiality of the calculation processing and the security of the authentication.

Meanwhile, the triplet comprises three fields: RAND, RES, and $K_c$. Here, the RAND field includes random number information used in the calculation performed in the subscriber identity module, the RES field includes information for verifying the result of the calculation performed in the subscriber identity module, and the $K_c$ field includes information for making the wireless communication path confidential, information for checking the content of the wireless communication, and so on. In the specification of Non-patent Document 1, there is no indication that the triplet includes information specifying an algorithm for use in the authentication calculation. The type of authentication vector to be used, of the two types of authentication vectors, i.e. the quintet or the triplet, depends on the system employed by the mobile communication network that is connected to the wireless local area network.

Hence, with the processing described in the specification of Non-patent Document 1, calculation specifying an algorithm from among a plurality of algorithms cannot be performed during authentication of a subscriber identity module within a wireless local area network when a mobile communication network that performs authentication using the quintet described in Non-patent Document 2 is set as the home network. This leads to a decrease in the confidentiality of the calculation processing. Furthermore, this problem, whereby calculation using an algorithm specified from among a plurality of algorithms cannot be performed, occurs similarly in the secret information, known only to the authentication vector generation device of the home network and the subscriber identity module, used in the calculation performed to improve the confidentiality of the authentication process.

It is therefore an object of the present invention to provide an authentication vector generation device, a subscriber identity module, a wireless communication system, an authentication vector generation method, a calculation method, and a subscriber authentication method, with which subscriber identity module authentication can be performed with no decrease in the confidentiality of the calculation processing, even when the subscriber identity module is located within a wireless local area network and the home network uses a triplet as an authentication vector.

A wireless communication system of the present invention is constituted by an authentication vector generation device and a subscriber identity module mounted on subscriber side terminal equipment that is capable of connecting to a wireless local area network. The authentication vector generation device comprises: authentication vector generating means for generating an authentication vector used to authenticate the subscriber identity module in the wireless local area network, which is connected to a mobile communication network, the authentication vector having a random number field for storing random numbers used in an authentication calculation performed in the subscriber identity module; and attaching means for attaching, to the random number field of the generated authentication vector, information specifying calculation information that is constituted by at least one of an algorithm and secret information for use in the calculation. The subscriber identity module comprises: calculation information storage means storing in advance a plurality of calculation information for use in the calculation to authenticate the subscriber identity module; reception means for receiving data for use in the calculation, transmitted from the subscriber side terminal equipment and including at least data in the random number field of the authentication vector used to authenticate the subscriber identity module in the wireless local area network; specifying means for specifying the calculation information to be used in the calculation from the plurality of calculation information stored in the calculation information storage means by referring to the information specifying the calculation information in the data of the random number field, included in the received data; calculating means for performing the calculation on the basis of the specified calculation information using the received data; and transmitting means for transmitting information regarding a calculated result of the calculation to the subscriber side terminal equipment.

An authentication vector generation device of the present invention comprises: authentication vector generating means for generating an authentication vector used to authenticate a subscriber identity module in a wireless local area network that is connected to a mobile communication network, the authentication vector having a random number field for storing random numbers used in an authentication calculation performed in the subscriber identity module; and attaching means for attaching, to the random number field of the generated authentication vector, information specifying calculation information that is constituted by at least one of an algorithm and secret information for use in the calculation.

A subscriber identity module of the present invention is mounted on subscriber side terminal equipment that is capable of connecting to a wireless local area network, and comprises: calculation information storage means storing in advance a plurality of calculation information constituted by at least one of an algorithm and secret information for use in a calculation to authenticate the subscriber identity module; reception means for receiving data for use in the calculation, transmitted from the subscriber side terminal equipment and including at least data in a random number field storing random numbers for use in the calculation, the random number field being provided in an authentication vector used to authenticate the subscriber identity module in the wireless local area network, which is connected to a mobile communication network; specifying means for specifying calculation information to be used in the calculation from the plurality of calculation information stored in the calculation information storage means by referring to information specifying the calculation information in the data of the random number field, included in the received data; calculating means for performing the calculation on the basis of the specified calculation information using the received data; and transmitting means for transmitting information regarding a calculated result of the calculation to the subscriber side terminal equipment.

During the authentication processing performed in this wireless communication system, first the information specifying the calculation information, which is constituted by at least one of an algorithm and secret information, is included by the authentication vector generation device in the random number field including the data transmitted to the subscriber identity module. The data in the random number field are transmitted to the subscriber identity module for use in the calculation, and therefore even when the authentication vector is a triplet, the data including the information specifying the calculation information can be received by the subscriber identity module. As a result, the authentication calculation is performed with specified calculation information. Thus a subscriber identity module in a wireless local area network can be authenticated using an authentication vector with no decrease in the confidentiality of the calculation processing, even when a triplet is employed as the authentication vector. Moreover, the authentication vector generation device provided in the system, and particularly the attaching means thereof, has a novel constitution. Also, the subscriber identity module provided in the system, and particularly the specifying means and calculating means thereof, has a novel constitution.

Incidentally, the present invention may be described not only as a wireless communication system, an authentication vector generation device, and a subscriber identity module, as described above, but also as an authentication vector generation method, a calculation method, and a subscriber authentication method, as described below. These are merely different ways of categorizing the present invention, and the present invention remains substantially the same, exhibiting similar actions and effects.

An authentication vector generation method of the present invention is executed in an authentication vector generation device, and comprises the steps of: generating an authentication vector used to authenticate a subscriber identity module in a wireless local area network that is connected to a mobile communication network, the authentication vector having a random number field for storing random numbers used in an authentication calculation performed in the subscriber identity module; and attaching, to the random number field of the generated authentication vector, information specifying calculation information that is constituted by at least one of an algorithm and secret information for use in the calculation.

A calculation method of the present invention is executed in a subscriber identity module that is mounted on subscriber side terminal equipment which is capable of connecting to a wireless local area network, the subscriber identity module storing in advance a plurality of calculation information constituted by at least one of an algorithm and secret information to be used in a calculation to authenticate the subscriber identity module. The calculation method comprises the steps of: receiving data for use in the calculation, transmitted from the subscriber side terminal equipment and including at least data in a random number field storing random numbers for use in the calculation, the random number field being provided in an authentication vector used to authenticate the subscriber identity module in the wireless local area network, which is connected to a mobile communication network; specifying calculation information to be used in the calculation from the plurality of calculation information by referring to information specifying the calculation information in the data of the random number field, included in the received data; performing the calculation on the basis of the specified calculation information using the received data; and transmitting information regarding a calculated result of the calculation to the subscriber side terminal equipment.

A subscriber authentication method of the present invention is performed in a wireless communication system comprising an authentication vector generation device, and a subscriber identity module mounted on subscriber side terminal equipment that is capable of connecting to a wireless local area network, the subscriber identity module storing in advance a plurality of calculation information that is constituted by at least one of an algorithm and secret information used in a calculation to authenticate the subscriber identity module. In the authentication vector generation device, the subscriber authentication method comprises the steps of: generating an authentication vector used to authenticate the subscriber identity module in the wireless local area network connected to a mobile communication network, the authentication vector having a random number field for storing random numbers used in the authentication calculation performed in the subscriber identity module; and attaching, to the random number field of the generated authentication vector, information specifying calculation information to be used in the calculation. In the subscriber identity module, which comprises calculation information storage means storing in advance a plurality of the calculation information for use in the calculation to authenticate the subscriber identity module, the subscriber authentication method comprises the steps of: receiving data for use in the calculation, transmitted from the subscriber side terminal equipment and including at least data in the random number field of the authentication vector used to authenticate the subscriber identity module in the wireless local area network; specifying the calculation information to be used in the calculation from the plurality of calculation information by referring to the information specifying the calculation information in the data of the random number field, included in the received data; performing the calculation on the basis of the specified calculation information using the received data; and transmitting information regarding a calculated result of the calculation to the subscriber side terminal equipment.

According to the present invention, information specifying the calculation information, which is constituted by at least one of an algorithm and secret information, is included by the authentication vector generation device in the random number field including the data transmitted to the subscriber identity module. As a result, the authentication calculation is performed in the subscriber identity module with specified calculation information. Therefore, a subscriber identity module in a wireless local area network can be authenticated using an authentication vector with no decrease in the confidentiality of the calculation processing, even when a triplet is employed as the authentication vector.

BRIEF DESCRIPTION OF THE DRAWINGS

FIG. 4 is a view showing another example of a RAND field in an authentication vector.

DESCRIPTION OF THE PREFERRED EMBODIMENTS

The present invention can be understood easily by means of the following detailed description, which is provided with reference to the attached drawings illustrating examples thereof. An embodiment of the present invention will now be described with reference to these attached drawings. Wherever possible, identical parts have been allocated identical reference symbols, and duplicate description thereof has been omitted.

Figure 1:
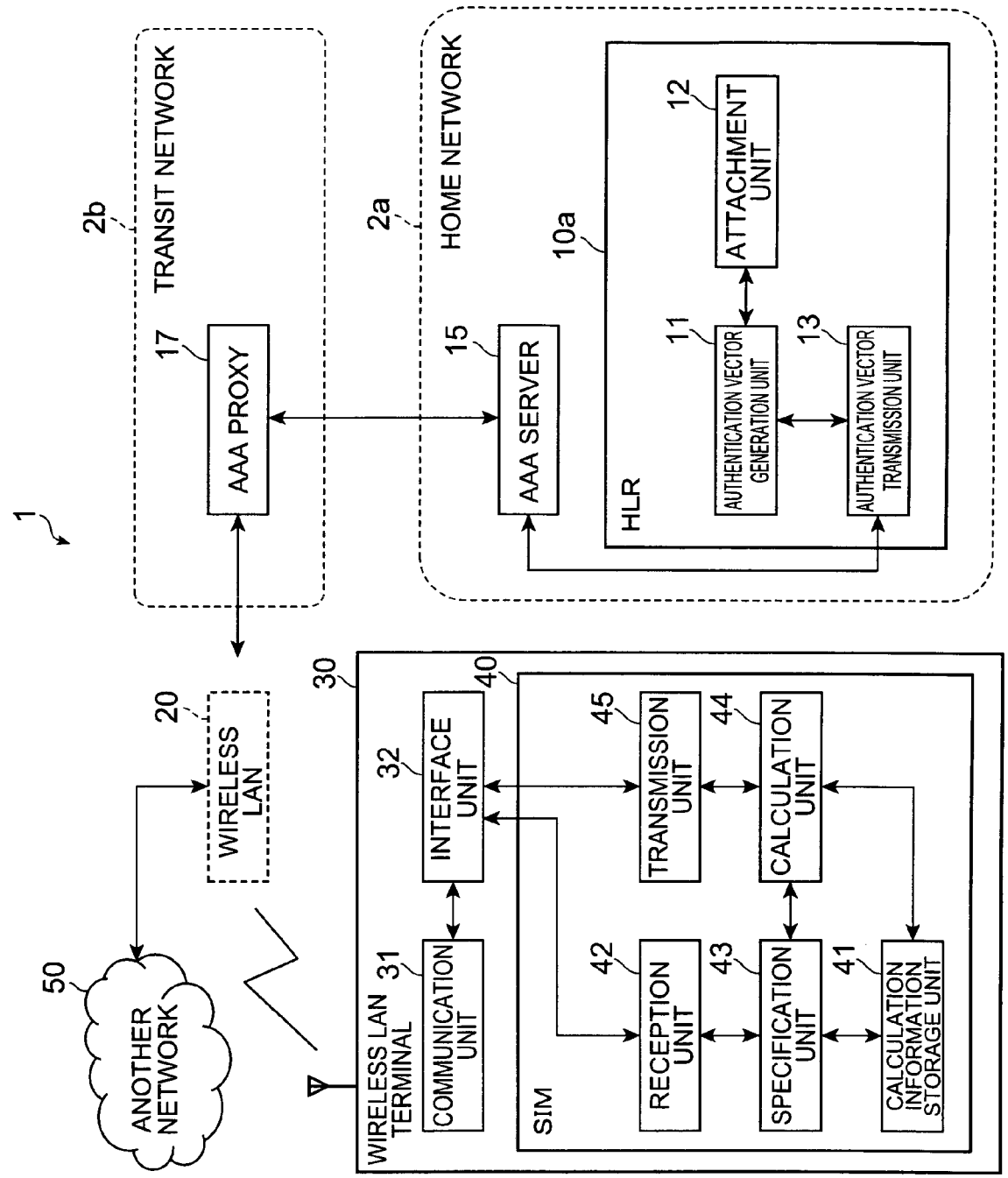
FIG. 1 is a view showing the constitution of a wireless communication system according to an embodiment of the present invention.

FIG. 1 shows the constitution of a wireless communication system 1 comprising an HLR 10 (authentication vector generation device) and an SIM 40 (subscriber identity module) according to this embodiment. As shown in FIG. 1, the wireless communication system 1 comprises mobile communication networks 2a, 2b, a wireless local area network 20, a wireless LAN terminal 30 (subscriber side terminal equipment), and the SIM 40. In the wireless communication system 1, the wireless LAN terminal 30 may be connected to the wireless local area network 20 by a wireless LAN protocol. The wireless local area network 20 controls connection of the wireless LAN terminal 30 to the wireless local area network 20 by performing authentication of the SIM 40 mounted on the wireless LAN terminal 30. This authentication is performed using the functions of the mobile communication networks 2a, 2b and the SIM 40.

Here, the mobile communication network 2a is the home network of the SIM 40 (in other words, when the SIM 40 is mounted on a mobile communication terminal, it is capable of communicating with the mobile communication network 2a). The mobile communication network 2b is a mobile communication network of another network operator (this mobile communication network will be referred to as the "transit network 2b" hereafter). Note, however, that the transit network 2b is included in the wireless communication system 1 only when the home network 2a is not directly connected to the wireless local area network 20. The home network 2a and transit network 2b are produced by one of IMT-2000 and GSM. Note that the home network 2a may authenticate the subscriber identity module using an authentication vector with a system other than IMT-2000 and GSM. Further, the transit network 2b may be any network that is capable of relaying data between the home network 2a and the wireless local area network 20. The wireless communication system 1 will now be described in detail. First, each constitutional element of the wireless communication system 1 will be described.

As shown in FIG. 1, the mobile communication network 2 comprises the HLR 10, an AAA (Authentication, Authorization, Accounting) server (a so-called RADIUS (Remote Authentication Dial-In User Services) server) 15, and an AAA proxy 17.

The HLR 10 is a device for generating an authentication vector (AV) used to authenticate the subscriber identity module of the mobile communication network, and exists in each mobile communication network 2. The authentication vector is also used to authenticate the SIM 40 in the wireless local area network 20. Specifically, the HLR 10 is preferably realized by an information processing device (server device) constituted by a CPU, memory, and so on. As shown in FIG. 1, the HLR 10 comprises an authentication vector generation unit 11 (authentication vector generating means), an attachment unit 12 (attaching means), and an authentication vector transmission unit 13.

The authentication vector generation unit 11 generates an authentication vector used to authenticate the subscriber identity module. Authentication vector generation is triggered upon reception of an authentication vector issuance request transmitted from the AAA server 15. The authentication vector is generated by generating electronic data comprising a plurality of fields. The generated authentication vector will be described in detail below.

The attachment unit 12 reads the authentication vector generated by the authentication vector generation unit 11, and includes in the RAND field of the authentication vector information specifying calculation information to be used in the authentication calculation performed in the SIM 40. Here, the calculation information includes at least one of an algorithm and secret information to be used in the authentication calculation in the SIM 40. To improve the confidentiality of the calculation processing, a plurality of the calculation information is stored in the SIM 40 in advance, and the information to be used is specified at the time of calculation processing. The authentication vector generated by the authentication vector generation unit 11 and attached with information specifying the calculation information by the attachment unit 12 is transmitted to the authentication vector transmission unit 13.

The authentication vector transmission unit 13 transmits the generated authentication vector to the AAA server 15. Note that the information specifying the calculation information is preferably determined upon reception of an instruction from a control terminal (not shown) known as a console that is connected to the HLR 10.

The authentication vector generated by an HLR 10a of the home network 2a, or in other words the authentication vector generated to authenticate the SIM 40, will now be described. The authentication vector generated by the HLR 10a of the home network 2a is a triplet such as that shown in FIG. 2, comprising three fields, namely RAND, RES, and Kc.

Figure 2:
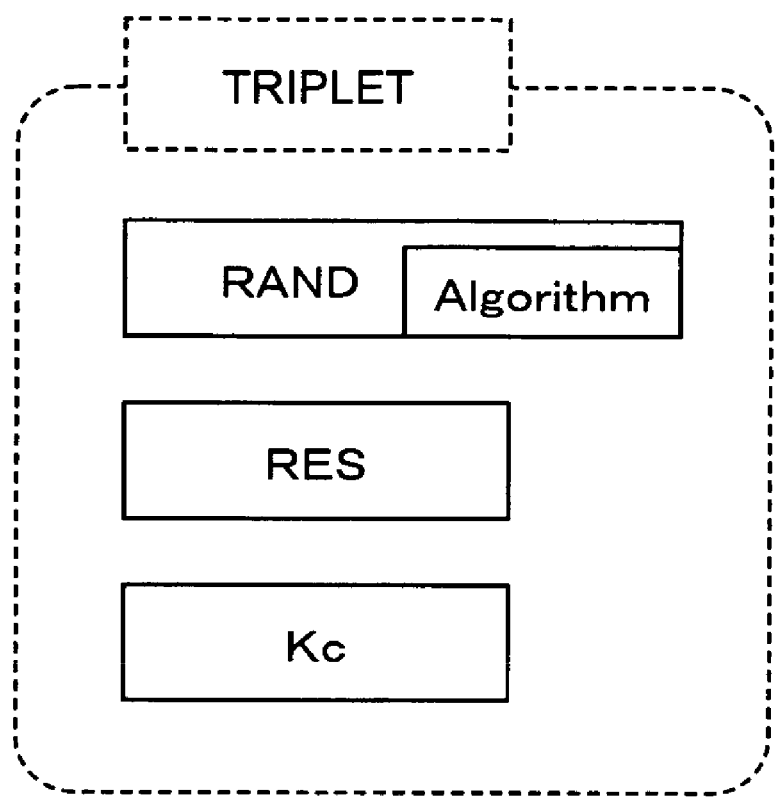
FIG. 2 is a view showing the constitution of a triplet.

Here, the RAND field is a random number field for storing random numbers to be used in the calculation performed in the SIM 40. Appropriate values are selected in the HLR 10a to serve as this random number information. The RES field includes information for verifying the result of the calculation performed in the SIM 40. This information is typically determined from the secret information and algorithm that are known only to the HLR 10a and the authentication subject SIM 40. Information for making the wireless communication path confidential, information for checking the wireless communication content, and so on is included in the Kc field. Note that in the specification of Non-patent Document 1 described above, there is no indication that information specifying the algorithm and secret information to be used in the authentication calculation is included in the triplet. The calculation information included in the authentication vector by the attachment unit 12 is included in a field having a preset location and data length within the RAND field. As shown in FIG. 2, for example, an Algorithm field having an appropriate data length is provided in the RAND field for specifying an algorithm, and a character string specifying an algorithm is included in the Algorithm field.

The AAA server 15 is a device for performing actual authentication processing when the wireless LAN terminal 30 is connected to the wireless local area network 20, using the authentication vector generated by the HLR 10. The AAA server 15 exists in each of the mobile communication networks 2 that perform authentication for the wireless local area network 20, is connected to the HLR 10 of these mobile communication networks 2, and is thus capable of transmitting and receiving information. The AAA server 15 is also connected to the wireless local area network 20 within the communication area of the mobile communication network 2 and the AAA proxy 17 of the other mobile communication network 2 by a telephone line, computer network, or the like so as to be capable of exchanging information with the wireless LAN terminal 30. The authentication processing performed in the AAA server 15 will be described in detail below.

The AAA proxy 17 is a device for relaying data used in the authentication process. As shown in FIG. 1, when the wireless local area network 20, which is the connection target of the wireless LAN terminal 30, is unable to exchange information with the home network 2a directly, the AAA proxy 17 of the transit network 2b that is connected directly to the wireless local area network 20 relays data between the wireless local area network 20 and the AAA server 15 of the home network 2a. Here, data is relayed between the AAA proxy 17 and AAA server 15 using the RADIUS (Remote Authentication Dial-In User Services (defined in RFC2138 and RFC2139)) protocol, for example. Note that when the home network 2a and wireless local area network 20 are connected directly, the transit network 2b is redundant, and therefore the AAA proxy 17 may be omitted.

The wireless local area network 20 is the connection target of the wireless LAN terminal 30 through the wireless LAN protocol. As shown in FIG. 1, the wireless local area network 20 is connected to another network 50 such as the Intranet or Internet, and hence the wireless LAN terminal 30 that is connected to the wireless local area network 20 is capable of accessing the another network 50 via the wireless local area network 20. The wireless local area network 20 performs authentication of the wireless LAN terminal 30 using the authentication function of the mobile communication network 2 described above. For this purpose, the wireless local area network 20 is capable of communicating with the AAA server 15 and AAA proxy 17 of the mobile communication network. Specifically, the wireless local area network 20 comprises an access point for exchanging wireless signals with the wireless LAN terminal 30, and so on, for example. Note that in this embodiment, the wireless local area network 20 serving as the connection target of the wireless LAN terminal 30 is not connected directly to the home network 2a, but instead is disposed in a position so as to be connected directly to the transit network 2b, and not connected directly to the home network 2a.

The wireless LAN terminal 30 is a device used by a user (a subscriber to the mobile communication network) to perform wireless LAN communication. As shown in FIG. 1, the wireless LAN terminal 30 comprises a communication unit 31 having a wireless LAN communication function, and an interface unit 32 for exchanging information with the SIM 40. Specifically, the wireless LAN terminal 30 is connected to DTE (Data Terminal Equipment) such as a PC (Personal Computer) or PDA (Personal Digital Assistant) via an interface such as a USB (Universal Serial Bus) interface or PCM-CIA (Personal Computer Memory Card Internal Association) interface, for example, and is used together with the PC, PDA, or the like.

The SIM 40 is a device that is mounted on the wireless LAN terminal 30 to perform the calculations required for the AAA server 15 to authenticate the SIM 40. Specifically, for example, the SIM 40 is preferably realized by a contact-type IC card that can be mounted on the wireless LAN terminal 30, which stores a home network identification number of the subscriber and information relating to the home network, and stores various information for improving subscriber convenience, such as the telephone number of the subscriber. As shown in FIG. 1, the SIM 40 comprises a calculation information storage unit 41 (calculation information storage means), a reception unit 42 (receiving means), a specification unit 43 (specifying means), a calculation unit 44 (calculating means), and a transmission unit 45 (transmitting means).

The calculation information storage unit 41 stores in advance a plurality of calculation information that is used in the authentication calculation. As described above, the calculation information is constituted by at least one of an algorithm and secret information for use in the calculation. The calculation information is typically known only to the HLR 10 and SIM 40. The algorithm stored as a method of calculation is preferably an algorithm that is suitable for use in an authentication calculation, such as 3DES (Data Encryption Standard), Milenage, or AES (Advanced Encryption Standard), for example.

The secret information stored as calculation information is known only to the HLR 10a and SIM 40, and used to improve the confidentiality of the authentication process. For example, the secret information corresponds to a secret key shared by the HLR 10a and SIM 40, or information relating to an auxiliary key constituting a part of the secret key used during the calculation in the HLR 10a and SIM 40 (the information relating to this auxiliary key serves as a constitutional element of the secret key at the time of calculation in the HLR 10a or SIM 40). More specifically, the secret information is preferably data having a predetermined information length, the information length of which is set differently for each algorithm used in the calculation. Note that the plurality of secret information stored in the calculation information storage unit 41 as calculation information does not have to have fixed data lengths. In this case, application rules are set between the HLR 10a and SIM 40 in advance to set an appropriate data length for each algorithm. Further, when only one of the algorithm and secret information is used as the calculation information, the other information for use in the calculation is also stored.

The reception unit 42 receives the data to be used in the calculation from the interface unit 32 of the wireless LAN terminal 30. The data transmitted from the wireless LAN terminal 30 include at least information in the RAND field of the authentication vector. The received data are transmitted to the specification unit 43. The specification unit 43 refers to the information specifying the calculation information that is included in the RAND field of the authentication vector within the received data, and specifies the calculation information to be used in the calculation from the plurality of calculation information stored in the calculation information storage unit 41. Information relating to the specified calculation information is transmitted to the calculation unit 44.

The calculation unit 44 performs an authentication calculation using the received data on the basis of the specified calculation information. Information regarding the result of the calculation is transmitted to the transmission unit 45 for transmission to the wireless LAN terminal 30. The transmission unit 45 transmits the calculated calculation result information to the wireless LAN terminal 30.

The processing that is executed by the wireless communication system 1 of this embodiment will now be described using the sequence diagram in FIG. 3. This processing is performed to authenticate the SIM 40 when the wireless LAN terminal 30 connects to the wireless local area network 20.

First, the user performs an operation or the like to connect the wireless LAN terminal 30 to the wireless local area network 20 using the wireless LAN protocol (S01). At the time of this connection, the SIM 40 transmits identification information specifying the SIM 40 to the wireless local area network 20 via the wireless LAN terminal 30. Specifically, an IMSI (International Mobile Subscriber Identity) or the like is used as an identifier.

Next, the wireless local area network 20 refers to the transmitted identification information to specify the AAA server 15 which employs an authentication processing function during authentication of the SIM 40 (S02). The AAA server 15 in the home network 2a of the SIM 40 is specified.

Next, the wireless local area network 20 transmits an authentication processing request to the AAA server 15 of the home network 2a to authenticate the SIM 40 (S03). At the time of this transmission, the identifier of the SIM 40 which is the authentication subject is also transmitted. Note that when the wireless local area network 20 is not connected directly to the home network 2a, this transmission is performed via the AAA proxy 17 in the transit network 2b. When the wireless local area network 20 is positioned within the communication area of the home network 2a so that direct communication is possible, transmission is performed directly from the wireless local area network 20 to the AAA server 15 without passing through the AAA proxy 17.

Having received the authentication processing request, the AAA server 15 issues the HLR 10a of the home network 2a with an authentication vector issuance request to authenticate the SIM 40 (S04). At the time of this request, the identification information of the SIM 40 is also transmitted to ensure that the HLR 10a is able to specify the authentication subject SIM 40.

In the HLR 10a which receives the issuance request, the authentication vector generation unit 11 generates an authentication vector corresponding to the SIM 40 on the basis of the identification information for the SIM 40 (S05). As described above, the authentication vector generated by the HLR 10a is a triplet. Typically, the information in the RES field of the generated authentication vector is calculated on the basis of a predetermined algorithm from the random number information included in the RAND field and the secret information corresponding to the SIM 40, which is stored in advance by the HLR 10a. The predetermined algorithm is an algorithm for use in the authentication calculation in the SIM 40. When an algorithm is included in the calculation information, the algorithm is selected from a plurality of algorithms stored in the SIM 40. Likewise, when secret information is included in the calculation information, the secret information is selected from a plurality of secret information stored in the SIM 40.

Next, the attachment unit 12 of the HLR 10a includes information specifying the calculation information in the RAND field of the generated authentication vector (S06). More specifically, as shown in FIG. 2, when the calculation information is an algorithm, an Algorithm field having an appropriate data length is preferably provided in the RAND field for specifying the algorithm, for example, and a character string specifying the algorithm is included in the Algorithm field. In this case, character strings are associated with the algorithms in advance such that the character string "01h" corresponds to 3DES, the character string "02h" corresponds to Milenage, the character string "03h" corresponds to AES, and so on, for example.

When the calculation information is secret information, a Key field specifying the secret information is preferably provided in the RAND field, as shown in FIG. 4A, and a character string specifying the secret information is included in the Key field. In this case, character strings are associated with the secret information in advance such that the character string "01h" corresponds to secret information Key-1, the character string "02h" corresponds to secret information Key-2, and so on, for example.

Both an algorithm and secret information may be used as the calculation information. In this case, the attachment unit 12 includes information specifying the calculation information constituted by both. More specifically, as shown in FIG. 4B, an Algorithm field specifying the algorithm and a Key field specifying the secret information are preferably provided in the RAND field. A character string specifying the algorithm and a character string specifying the secret information are included in the Algorithm field and the Key field, respectively. Here, the length of the Algorithm field and the length of the Key field are each set to one octet length, for example, to produce a total length of two bytes when combined. Further, algorithm specification and secret information specification may be performed independently, or the algorithm and secret information may be specified in combination.

The RAND field has to include the random number information that is originally included in this field, and therefore the field including the information which specifies the calculation information should be as small as possible. Furthermore, the information specifying the calculation information may either be encrypted using any method, or left in plain text. In this embodiment, authentication vector generation (S05) and attachment of the information specifying the calculation information (S06) are described as being separate processes, but authentication vector generation and attachment of the information specifying the calculation information may be performed in a single process.

The generated authentication vector is transmitted to the authentication vector transmission unit 13 and issued. In other words, the authentication vector transmission unit 13 transmits the authentication vector to the AAA server 15 which issued the authentication vector issuance request (S07). The AAA server 15 receives the transmitted authentication vector.

Having received the authentication vector, the AAA server 15 transmits authentication information to the SIM 40 (S08). The authentication information includes at least the information in the RAND field. This transmission is performed via the AAA proxy 17 of the transit network 2b, the wireless local area network 20, and the communication unit 31 and interface unit 32 of the wireless LAN terminal 30.

Next, the reception unit 42 of the SIM 40 receives authentication information transmitted from the wireless LAN terminal 30, or in other words the data for use in the authentication calculation. After the data are received, the specification unit 43 reads the data, refers to the information specifying the calculation information in the RAND field, and specifies calculation information from the plurality of calculation information stored in the calculation information storage unit 41 (S09). More specifically, the character strings indicating the calculation information in the Algorithm field and Key field are read, and specification of the calculation information is performed using these character strings together with information regarding the associations between the character strings and calculation information.

Next, the calculation unit 44 performs the authentication calculation using the random number information included in the RAND field, on the basis of the calculation information specified by the specification unit 43 (S10). The calculation result is transmitted to the transmission unit 45, and the transmission unit 45 transmits the calculation result to the wireless LAN terminal 30. The transmitted calculation result is transmitted to the AAA server 15 via the communication unit 31 of the wireless LAN terminal 30, the wireless local area network 20, and so on (S11). Having received ,the calculation result, the AAA server 15 uses the verification information included in the RES field of the authentication vector to verify that the calculation result is correct, and thus authenticates the SIM 40 (S12). More specifically, this verification is performed by determining whether or not the value included in the RES field and the value of the calculation result are identical.

Next, the AAA server 15 transmits information regarding the result of verification of the SIM 40 to the wireless local area network 20 (S13). The verification result information is used to control connection of the wireless LAN terminal 30 to the wireless local area network 20, for example. More specifically, when it is determined, as a result of the authentication, that the SIM 40 (and wireless LAN terminal 30) is not authorized to connect to the wireless local area network 20, the wireless local area network 20 takes measures such as cutting the connection.

According to the embodiment described above, an authentication calculation is performed with specified calculation information even when a triplet is employed as the authentication vector used in the authentication. As a result, the SIM 40 can be authenticated with no decrease in the confidentiality of the calculation processing. Accordingly, the lifetime of the SIM 40 can be extended in terms of security. The fact that the confidentiality of the calculation processing does not decrease can also be used as a measure to prevent cloning of the SIM 40.

Figure 3:
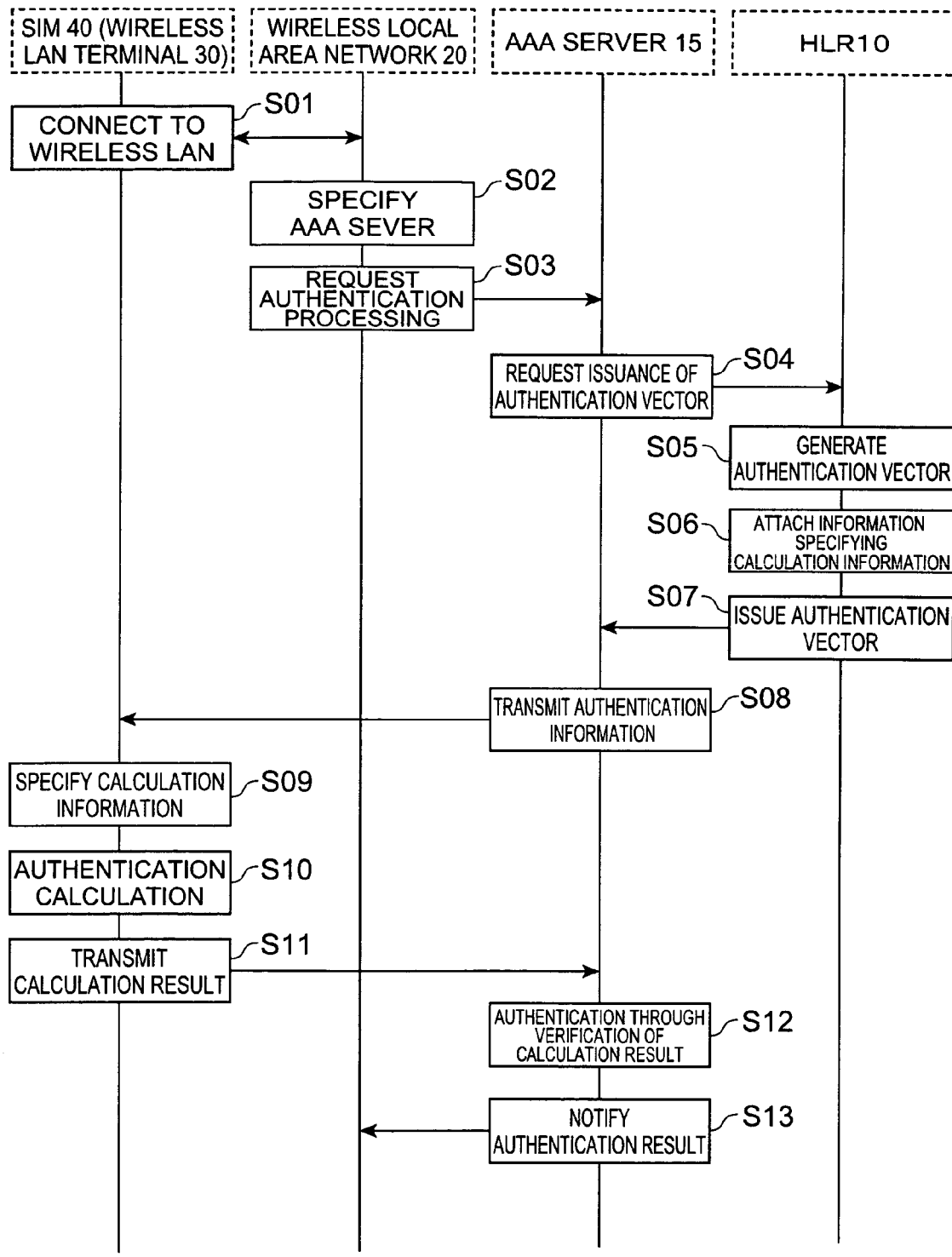
FIG. 3 is a sequence diagram showing processing executed by the wireless communication system in this embodiment.

Moreover, the parts of this embodiment that must be modified from a conventional wireless communication system are only the authentication vector generation process of the HLR 10a (S05 and S06 in FIG. 3), and the process to authenticate the SIM 40 (S09 and S10 in FIG. 3). No modifications need to be made to the AAA server 15 and wireless local area network 20, and therefore this embodiment can be realized easily.

Note that in this embodiment, the wireless local area network 20 and AAA server 15 exchange data via the AAA proxy 17, but when the wireless local area network 20 is located within the communication area of the home network 2a, data may be exchanged between the wireless local area network 20 and AAA server 15 directly.

Further, in this embodiment the subscriber identity module is an SIM, but a USIM may be used. Also, in this embodiment the authentication vector generation device are an HLR, but an HSS (Home Subscriber Server) may be used.

What is claimed is:

1. An authentication vector generation device comprising:
   authentication vector generating means for generating an authentication vector used to authenticate a subscriber identity module in a wireless local area network connected to a mobile communication network, said authentication vector having a random number field for storing random numbers used in an authentication calculation performed in said subscriber identity module;
   attaching means for attaching, inside said random number field of said generated authentication vector, a calculation information element including information, separate from the random numbers stored in the random number field, specifying an algorithm and secret information having a predetermined number of bits for use in said authentication calculation, the number of bits of the secret information being set differently for each of a plurality of algorithms specified by the calculation information element; and
   transmitting means for transmitting to said mobile communication network said random number field which includes said calculation information element, wherein said subscriber identity module initiates said authentication calculation based on said calculation information element including information separate from the random numbers specifying said algorithm and secret information.

2. The authentication vector generation device according to claim 1, wherein the information specifying said algorithm and said secret information is arranged in a character string separate from said random numbers.

3. The authentication vector generation device according to claim 1, wherein
the authentication vector generated by the authentication vector generation means includes second secret information,
the secret information of the calculation information element is distinct from the second secret information of the authentication vector, and
the secret information of the calculation information element is an auxiliary key that is a secret key used in the authentication calculation.

4. The authentication vector generation device according to claim 1, wherein the calculation information element is encrypted.

5. A subscriber identity module mounted on subscriber side terminal equipment that is capable of connecting to a wireless local area network, comprising:
calculation information storage means storing in advance a plurality of calculation information elements including information specifying an algorithm and secret information having a predetermined number of bits for use in an authentication calculation to authenticate said subscriber identity module, the number of bits of the secret information being set differently for each of a plurality of algorithms specified by the calculation information element;
reception means for receiving data including a calculation information element for use in said authentication calculation, said data being transmitted from said subscriber side terminal equipment by attaching at least one calculation information element including information specifying an algorithm and secret information inside a random number field storing random numbers for use in said authentication calculation, said random number field being provided in an authentication vector used to authenticate said subscriber identity module in said wireless local area network connected to a mobile communication network, and information specifying said algorithm and secret information being separate from said random numbers stored in the random number field;
specifying means for specifying a calculation information element, to be used in said authentication calculation, from said plurality of calculation information elements stored in said calculation information storage means by referring to said at least one calculation information element attached inside said random number field, included in said received data;
calculating means for initiating said authentication calculation on the basis of said at least one calculation information element including information separate from said random numbers specifying said algorithm and said secret information, and for performing said authentication calculation using said received data; and
transmitting means for transmitting information regarding a calculated result of said authentication calculation to said subscriber side terminal equipment.

6. The subscriber identity module according to claim 5, wherein the information specifying said algorithm and said secret information is arranged in a character string separate from said random numbers.

7. A wireless communication system comprising:
an authentication vector generation device; and
a subscriber identity module mounted on subscriber side terminal equipment which is capable of connecting to a wireless local area network,
said authentication vector generation device including,
authentication vector generating means for generating an authentication vector used to authenticate said subscriber identity module in said wireless local area network connected to a mobile communication network, said authentication vector having a random number field for storing random numbers used in an authentication calculation performed in said subscriber identity module;
attaching means for attaching, inside said random number field of said generated authentication vector, a calculation information element including information, separate from the random numbers stored in the random number field, specifying an algorithm and secret information having a predetermined number of bits for use in said authentication calculation, the number of bits of the secret information being set differently for each of a plurality of algorithms specified by the calculation information element; and
transmitting means for transmitting to said mobile communication network said random number field which includes said calculation information element, and
said subscriber identity module including,
calculation information storage means storing in advance a plurality of calculation information elements for use in said authentication calculation to authenticate said subscriber identity module;
reception means for receiving data including said calculation information element for use in said authentication calculation, said data being transmitted from said subscriber side terminal equipment by attaching at least one calculation information element including information separate from said random numbers specifying an algorithm and secret information inside said random number field of said authentication vector used to authenticate said subscriber identity module in said wireless local area network;
specifying means for specifying a calculation information element, to be used in said authentication calculation, from said plurality of calculation information elements stored in said calculation information storage means by referring to said at least one calculation information element attached inside said random number field, included in said received data;
calculating means for initiating said authentication calculation on the basis of said at least one calculation information element including information separate from said random numbers specifying said algorithm and said secret information, and for performing said authentication calculation using said received data; and
transmitting means for transmitting information regarding a calculated result of said authentication calculation to said subscriber side terminal equipment.

8. The wireless communication system according to claim 7, wherein the information specifying said algorithm and said secret information is arranged in a character string separate from said random numbers.

9. An authentication vector generation method in an authentication vector generation device, comprising:
generating an authentication vector used to authenticate a subscriber identity module in a wireless local area network connected to a mobile communication network, said authentication vector having a random number field for storing random numbers used in an authentication calculation performed in said subscriber identity module;

attaching, inside said random number field of said generated authentication vector, a calculation information element including information, separate from the random numbers stored in the random number field, specifying an algorithm and secret information having a predetermined number of bits for use in said authentication calculation, the number of bits of the secret information being set differently for each of a plurality of algorithms specified by the calculation information element;

transmitting to said mobile communication network said random number field which includes said calculation information element; and initiating, in said subscriber identity module, said authentication calculation based on said calculation information element including information separate from said random numbers specifying said algorithm and secret information.

10. The authentication vector generation method according to claim 9, wherein the information specifying said algorithm and said secret information is arranged in a character string separate from said random numbers.

11. A calculation method in a subscriber identity module which is mounted on subscriber side terminal equipment that is capable of connecting to a wireless local area network, said calculation method comprising:

storing, in advance, a plurality of calculation information elements, each calculation information element including an algorithm and secret information having a predetermined number of bits to be used in an authentication calculation to authenticate said subscriber identity module, the number of bits of the secret information being set differently for each of a plurality of algorithms specified by the calculation information element;

receiving data including a calculation information element for use in said authentication calculation, said data being transmitted from said subscriber side terminal equipment by attaching at least one calculation information element including information specifying an algorithm and secret information inside a random number field storing random numbers for use in said calculation, said random number field being provided in an authentication vector used to authenticate said subscriber identity module in said wireless local area network connected to a mobile communication network, and said information specifying said algorithm and secret information being separate from said random numbers stored in the random number field;

specifying a calculation information element, to be used in said authentication calculation, from said stored plurality of calculation information elements by referring to said at least one calculation information element attached inside said random number field included in said received data;

initiating said authentication calculation on the basis of said at least one specified calculation information element including information separate from said random numbers specifying said algorithm and said secret information, and for performing said authentication calculation using said received data; and transmitting information regarding a calculated result of said authentication calculation to said subscriber side terminal equipment.

12. The calculation method in a subscriber identity module according to claim 11, wherein the information specifying said algorithm and said secret information is arranged in a character string separate from said random numbers.

13. A subscriber authentication method in a wireless communication system comprising an authentication vector generation device, and a subscriber identity module mounted on subscriber side terminal equipment that is capable of connecting to a wireless local area network, said subscriber authentication method comprises:

storing, in advance, a plurality of calculation information elements, each calculation information element including an algorithm and secret information having a predetermined number of bits to be used in an authentication calculation to authenticate said subscriber identity module, the number of bits of the secret information being set differently for each of a plurality of algorithms specified by the calculation information element;

generating an authentication vector used to authenticate said subscriber identity module in said wireless local area network connected to a mobile communication network, said authentication vector having a random number field for storing random numbers used in said authentication calculation performed in said subscriber identity module;

attaching, inside said random number field of said generated authentication vector, a calculation information element including information, separate from said random numbers stored in the random number field, specifying an algorithm and secret information to be used in said authentication calculation;

receiving data for use in said authentication calculation, said data being transmitted from said subscriber side terminal equipment by attaching said calculation information element including information separate from said random numbers specifying an algorithm and secret information inside said random number field of said authentication vector used to authenticate said subscriber identity module in said wireless local area network;

specifying said calculation information element, to be used in said authentication calculation, from said stored plurality of calculation information elements by referring to said calculation information element attached inside said random number field included in said received data;

initiating said authentication calculation on the basis of said specified calculation information element including said algorithm and said secret information, and for performing said authentication calculation using said received data; and transmitting information regarding a calculated result of said authentication calculation to said subscriber side terminal equipment.

14. The subscriber authentication method according to claim 13, wherein the information specifying said algorithm and said secret information is arranged in a character string separate from said random numbers.

15. An authentication vector generation device comprising:

an authentication vector generating device configured to generate an authentication vector used to authenticate a subscriber identity module in a wireless local area network connected to a mobile communication network, said authentication vector having a random number field for storing random numbers used in an authentication calculation performed in said subscriber identity module;

an attaching device configured to attach inside said random number field of said generated authentication vector, a calculation information element including information, separate from said random numbers stored in the random number field, specifying an algorithm and secret information having a predetermined number of bits for use in said authentication calculation, the number of bits of the secret information being set differently for each of a plurality of algorithms specified by the calculation information element; and a transmitter configured to transmit to said mobile communication network said random number field which includes said calculation information element, wherein said subscriber identity module initiates said authentication calculation based on said calculation information element including information separate from said random numbers specifying said algorithm and secret information for use in said authentication calculation.

16. The authentication vector generation device according to claim 15, wherein the information specifying said algorithm and said secret information is arranged in a character string separate from said random numbers.

17. A subscriber identity module mounted on subscriber side terminal equipment that is capable of connecting to a wireless local area network, comprising:

a calculation information storage device configured to store in advance a plurality of calculation information elements, each calculation information element including an algorithm and secret information having a predetermined number of bits for use in an authentication calculation to authenticate said subscriber identity module, the number of bits of the secret information being set differently for each of a plurality of algorithms specified by the calculation information element;

a reception device configured to receive data including a calculation information element for use in said authentication calculation, said data being transmitted from said subscriber side terminal equipment by attaching at least one calculation information element including information specifying an algorithm and secret information inside a random number field storing random numbers for use in said authentication calculation, said random number field being provided in an authentication vector used to authenticate said subscriber identity module in said wireless local area network connected to a mobile communication network, and said information specifying said algorithm and secret information being separate from said random numbers stored in the random number field;

a specifying device configured to specify a calculation information element, to be used in said authentication calculation, from said plurality of calculation information elements stored in said calculation information storage device by referring to said at least one calculation information element attached inside said data of said random number field included in said received data;

a calculating device configured to initiate said authentication calculation on the basis of said at least one calculation information element including information separate from said random numbers specifying said algorithm and said secret information, and to perform said authentication calculation using said received data; and a transmitting device configured to transmit information regarding a calculated result of said authentication calculation to said subscriber side terminal equipment.

18. The subscriber identity module according to claim 17, wherein the information specifying said algorithm and said secret information is arranged in a character string separate from said random numbers.

19. A wireless communication system comprising:
an authentication vector generation device;
and a subscriber identity module mounted on subscriber side terminal equipment which is capable of connecting to a wireless local area network,
said authentication vector generation device including,
an authentication vector generating device configured to generate an authentication vector used to authenticate said subscriber identity module in said wireless local area network connected to a mobile communication network, said authentication vector having a random number field for storing random numbers used in an authentication calculation performed in said subscriber identity module;

an attaching device configured to attach inside said random number field of said generated authentication vector, a calculation information element including information, separate from said random numbers stored in the random number field, specifying an algorithm and secret information having a predetermined number of bits for use in said authentication calculation, the number of bits of the secret information being set differently for each of a plurality of algorithms specified by the calculation information element; and a transmitting device configured to transmit to said mobile communication network said random number field which includes said calculation information element, and said subscriber identity module including,
a calculation information storage device configured to store in advance a plurality of calculation information elements for use in said authentication calculation to authenticate said subscriber identity module;

a reception device configured to receive data including said calculation information element for use in said authentication calculation, said data being transmitted from said subscriber side terminal equipment by attaching at least one calculation information element including information separate from said random numbers specifying an algorithm and secret information inside said random number field of said authentication vector used to authenticate said subscriber identity module in said wireless local area network;

a specifying device configured to specify said calculation information element, to be used in said authentication calculation, from said plurality of calculation information elements stored in said calculation information storage device by referring to said at least one calculation information element attached inside said random number field, included in said received data;

a calculating device configured to initiate said authentication calculation on the basis of said at least one calculation information element including information separate from said random numbers specifying said algorithm and said secret information, and to perform said authentication calculation using said received data; and a transmitting device configured to transmit information regarding a calculated result of said authentication calculation to said subscriber side terminal equipment.

20. The wireless communication system according to claim 19, wherein the information specifying said algorithm and said secret information is arranged in a character string separate from said random numbers.

* * * * *